US006629746B2

(12) United States Patent
Waldner et al.

(10) Patent No.: US 6,629,746 B2
(45) Date of Patent: Oct. 7, 2003

(54) REDUCTION OF ARTEFACTS IN REPRODUCED IMAGES

(75) Inventors: Stephan Waldner, Zürich (CH); Armin Kündig, Zürich (CH); Guido Keller, Adlikon (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 09/987,149

(22) Filed: Nov. 13, 2001

(65) Prior Publication Data

US 2002/0080375 A1 Jun. 27, 2002

(30) Foreign Application Priority Data

Nov. 10, 2000 (EP) .............................. 00124253

(51) Int. Cl.[7] .............................................. B41J 29/393
(52) U.S. Cl. ...................................................... 347/19
(58) Field of Search .............................. 347/15, 19, 43; 359/1.9, 501, 401

(56) References Cited

U.S. PATENT DOCUMENTS 5,289,208 A    2/1994  Haselby
5,844,585 A   12/1998  Kurashima et al.
6,000,776 A   12/1999  Suzuki et al.
6,390,583 B1 * 5/2002  Kato et al. ................... 347/15

FOREIGN PATENT DOCUMENTS

| EP | 0 600 707 A1 | 6/1994 |
| EP | 0 869 663 A2 | 10/1998 |
| EP | 0 933 223 A1 | 8/1999 |

* cited by examiner

*Primary Examiner*—Lamson Nguyen
(74) *Attorney, Agent, or Firm*—Burns, Doane, Swecker & Mathis, LLP

(57) ABSTRACT

A process for the reduction of artefacts during the reproduction of an image based on image data and having a plurality of image points, by a specific image reproducing device is disclosed, whereby the image points have appearance properties, the process including the following steps: device characteristics which describe the appearance properties of image points produced by the specific image reproducing device in answer to image data and describe the dependence of the appearance properties on the position assigned to the image data, are provided or input, reproduction image data are input, and the image data corrected based on the device characteristics and depending on the positions assigned to the image data.

13 Claims, 5 Drawing Sheets

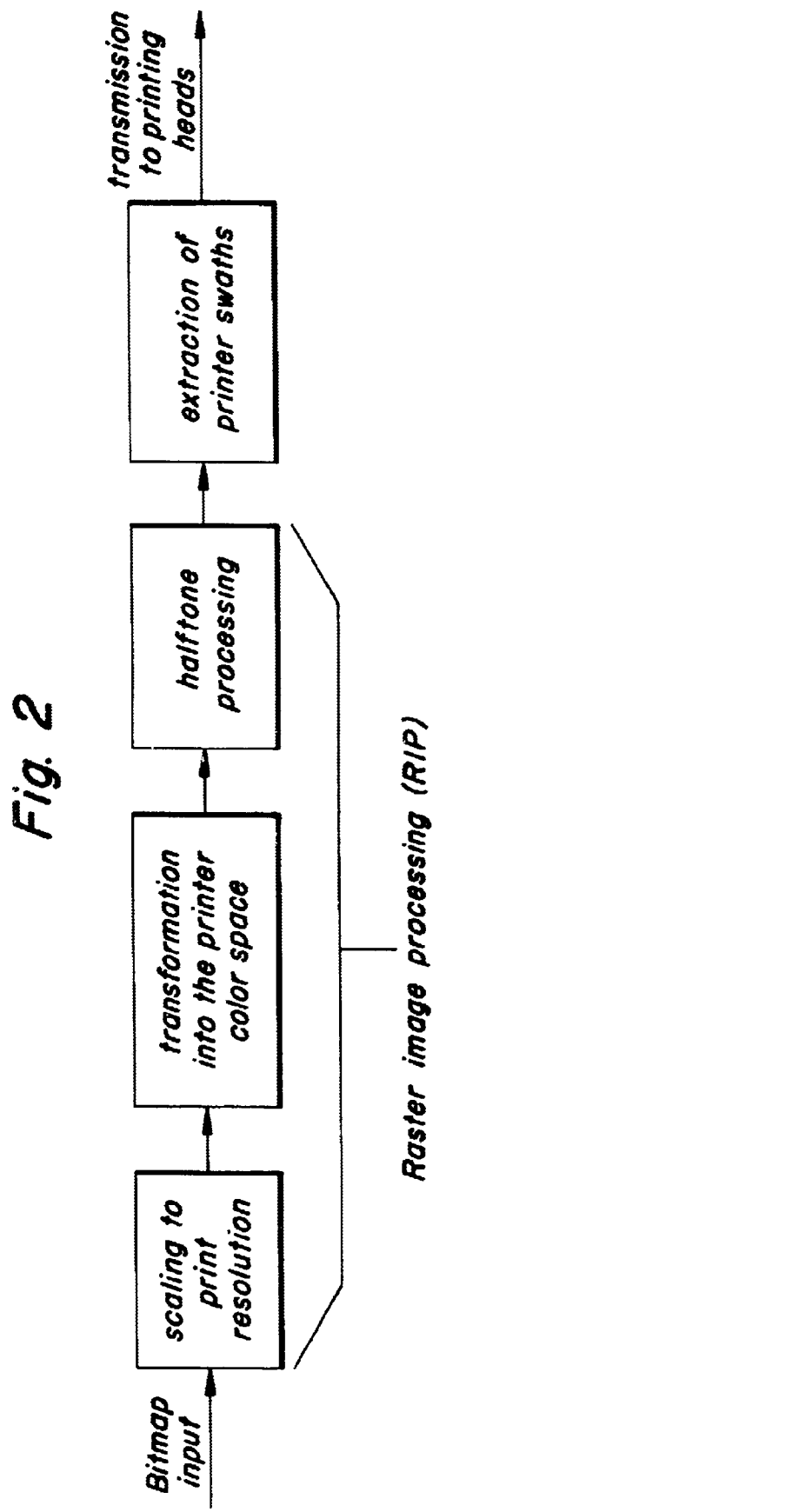

Fig. 3  $(d_{c1}, d_{c2}, ..., d_{cn}; N_1, N_2, ..., N_m)$

| Nozzle member | ink color 1 | | | | | ink color 2 | |
|---|---|---|---|---|---|---|---|
| | droplet size 1 | | droplet size 2 | | ... | ... | droplet size p |
| | Δxpos | D | Δxpos | Δypos | ... | ... | Δxpos | Δypos | D |
| 1 | | | | | | | | | |
| 2 | | | | | | | | | |
| 3 | | | | | | | | | |
| ... | | | | | | | | | |
| n | | | | | | | | | |

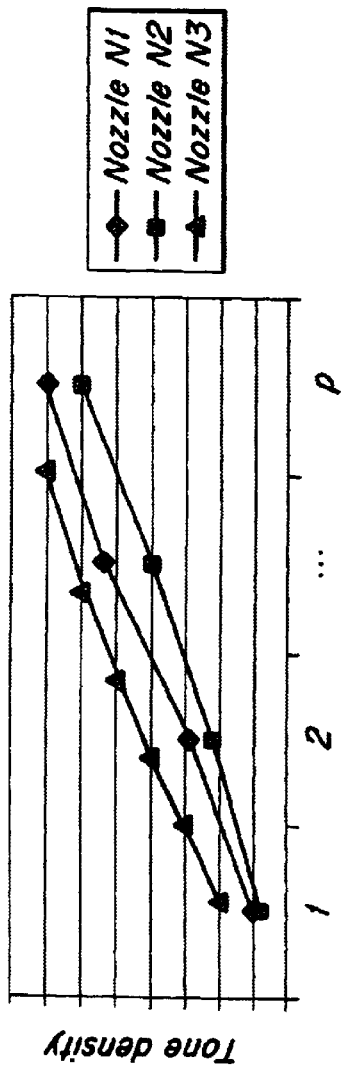
Fig. 5
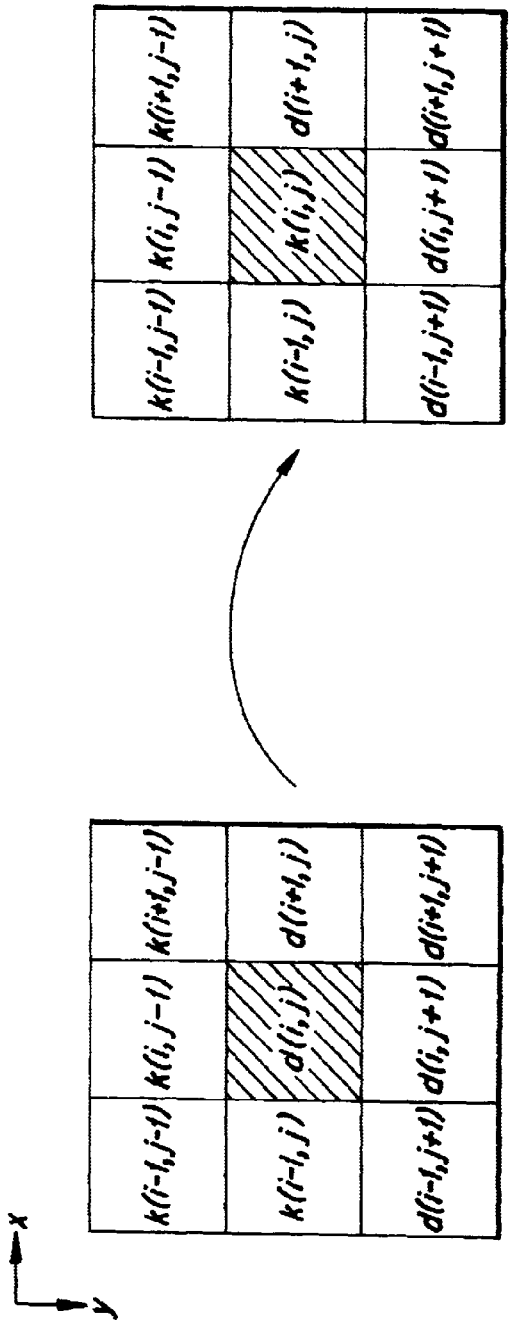
Fig. 6a
Fig. 6b

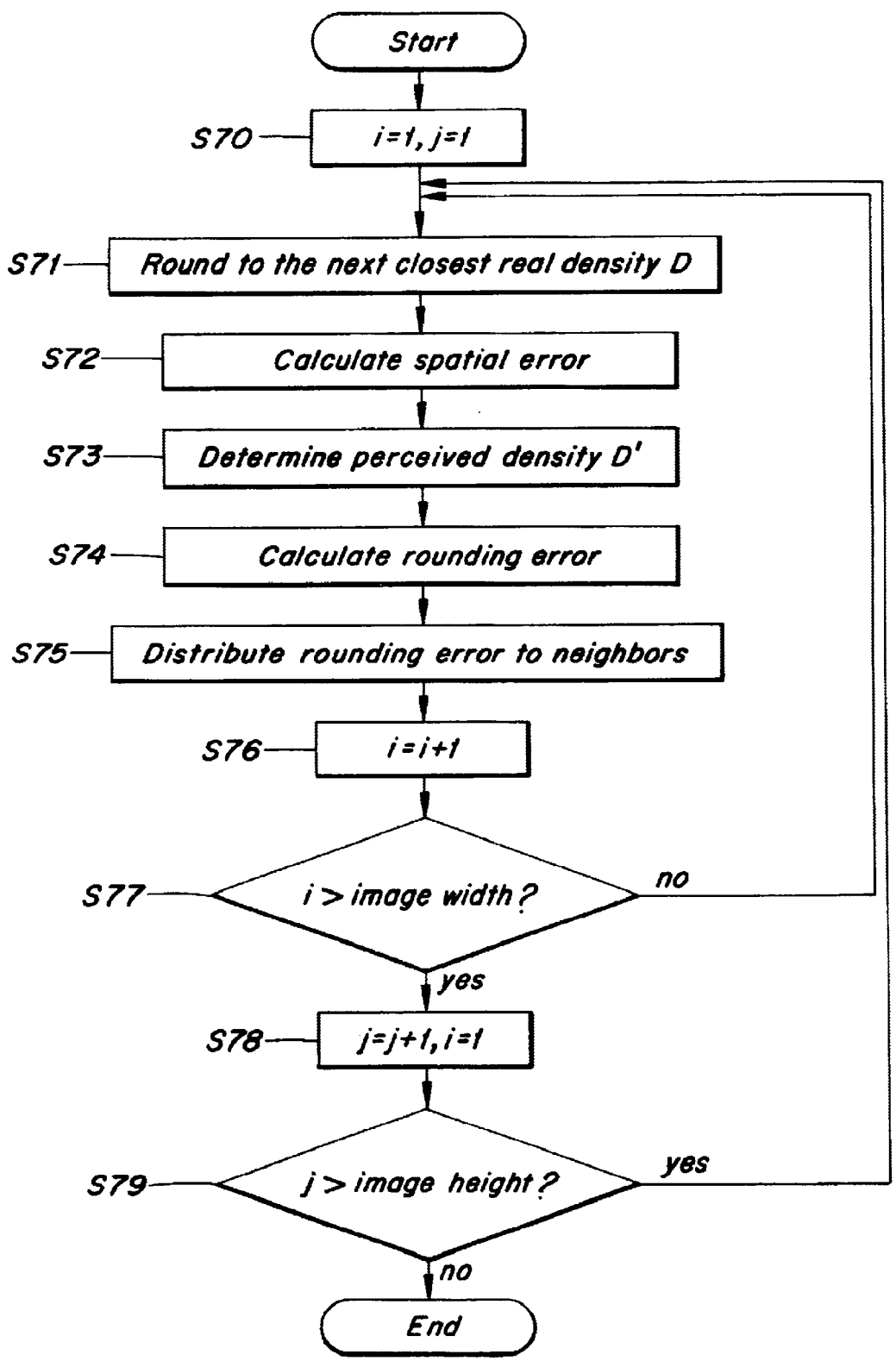

REDUCTION OF ARTEFACTS IN REPRODUCED IMAGES

This application claims priority under 35 U.S.C. §§119 and/or 365 to 00 124 253.6 filed in Europe on Nov. 10, 2000; the entire content of which is hereby incorporated by reference.

FILED OF THE INVENTION

The present invention relates to processes for the reduction of artefacts in the reproduction or display of images, especially photographic images which include an multitude of image points. The invention further relates to image reproducing devices, such as printers (inkjet printers, laser printers, thermal printers, and so on), monitors (for example, ICD monitors or cathel gray monitors or CRT monitors) and devices for the capturing of images on radiation sensitive (especially light sensitive) media (for example photographic paper), for example photoprinters or DMD's (digital mirror devices) functioning with lasers or monitors. Particularly, the invention relates to image reproducing devices which reproduce photographs, whereby the reproduction of photographs also includes the generation of photographs on media, especially photographic paper or normal paper. The image data are especially photographic image data, which were captured with an image capturing apparatus, such as, for example, a photographic apparatus, a camera (for example film camera, digital camera, video camera).

The invention further relates to photographic labs, especially minilabs, which use an image reproducing device, an error correction process or a large space lab.

The invention relates further to programs which carry out error correction process.

BACKGROUND ART

A high quality is demanded especially in the photographic field for images which are based on digital image data. A series of different image reproducing devices are used for the reproduction, especially in the photographic field, besides monitors, especially image reproducing devices which will reproduce the image on a medium. Different printers or writing devices are especially used which reproduce images on radiation sensitive media (light sensitive media) by beams (for example, light beams or particle beams or electrode beams). It is common to all image reproduction techniques that image data which define the image to be reproduced, are converted into image data which are suited for the control of the image reproducing device so that the image reproducing device produces the most exact as reproduction possible of the image defined by the original image data.

The present invention relates to devices and processes wherein an image (especially bitmap image) is reproduced with a multitude of individual image points and the image data describe the nominal properties of the individual image points. The properties of the image points are appearance properties, which describe the visual impression which the image point at a certain position in an image has on a human observer, or which, in other words, influence or determine the visual or optical appearance of the image point in the image. The appearance properties of the image points include especially the geometric properties of the image point, such as its relative position (distance) to the adjacent image points or deviation from a nominal position and image point size and image point shape. Properties of the image point are, for example, also its color value or its position in the color space, which can be described, for example, by a lab vector, such as, for example, color, color saturation, color tone, brightness, luminance, and so on. The appearance properties can also be defined for a defined illumination of the image, for example, with a standard light source (for example. D65) at a given aperture angle. Appearance properties can also be determined by the color values of adjacent image points of an image point and their color interaction for the observer as well as by properties of a medium (for example, glossy paper, matte paper) especially with respect to the reflection of an illumination light.

Prior processes for the image reproduction rely on the image reproducing device always answering the same to each arriving image data, irrespective of the location or position of the image point in the image. For this purpose, so called profiles of the image reproducing device are generated to reproduce, for example, a color defined by the arriving image data in a desired manner. Irrespective of the location where the image point is produced, input GB data are converted, for example, into exiting CMYK data for each image point and in the same manner.

This approach produces satisfying results when the image reproducing device answers in the same manner to incoming image data for each image point to be reproduced. However, this is not the case in reality. For example, in an inkjet printer, not all image points are reproduced at the intended position, with the intended dot size and with the intended color value. The actual appearance properties of the image points therefore do not correspond (depending on the position) with the desired appearance properties. The same applies to the other above-mentioned image reproducing devices. For example, the different lasers of a laser printer can produce different image point sizes or the LCD transistors of the monitor can be unevenly spaced.

In order to prevent such errors in the image reproduction as much as possible, a high mechanical effort is made in order to guarantee the most uniform answer possible of the image reproducing device to all the image points to be produced, or one attempts an averaging of the deviations in the control of the image reproducing device. Examples for ink-jet printers are found, for example, in U.S. Pat. No. 5,844,585 and U.S. Pat. No. 5,289,208, the disclosures of which are hereby incorporated by reference in their entireties.

The problems of the prior art are discussed in more detail in the following with reference to inkjet printers. A frequent problem in inkjet printers is the incorrect placement of image points (dots) which is produced by an incorrect orientation or different ejection speeds of the individual nozzles. Furthermore, the individual nozzles can produce different dot sizes. If several printing heads are used, the exact orientation of the printing heads to one another also constitutes a problem. In order to solve these problems, a frequent cleaning of the nozzles was suggested at least in part A solution for an increase in the accuracy of the mutual orientation and control of the printing heads was suggested (U.S. Pat. No. 5,289,208). Further suggested were multiple printing passes with the same nozzles and in the same printing region (U.S. Pat. No. 5,844,585).

However, with the suggested solutions, the printing speeds decreased in the case of several printing passes, the ink consumption increases in the case of frequent cleaning and the cost increases in the case of an increased mechanical precision.

SUMMARY OF THE INVENTION

It is now an object of the invention to provide an improved image quality in the image reproduction even at a lower mechanical precision of the image reproducing device.

This object is achieved in accordance with the invention with a process for the reduction of artefacts in reproduced images wherein control values for the reproduction of the image points by the image reproducing device are set based on the image data associated with the image points and taking into consideration the influences on the appearance properties of the image points to be reproduced. The influences are determined based on the device characteristics and depending on the position of the image points.

In the process in accordance with the invention, at least part of the appearance properties (such as, for example, color value and/or position deviation) of the individual image points, which result with a specific image reproducing device, are used as the basis for the reduction of artefacts in the image reproduction. It is a further advantageous aspect of the invention that in particular the position dependent influence (image point position) on the appearance properties is considered by way of the characteristics of the image reproducing device (device characteristics). The appearance properties are determined, especially position dependent, by way of a test image which was produced by the specific image reproducing device. An optical measuring device, such as a camera (for example a digital camera) is used herefor.

The test image data forming the basis of the test image are preferably selected such that at least a large part of the possible different appearance properties of an image point are represented in the test image or the test images. The measurements are preferably carried out in such a way that influences on the appearance properties such as, for example, deviations of the position of an image point from its nominal position, changes of the spacing of an image point from its neighbours, changes of the color density of an image point, changes in the shape of an image point and/or changes of the color value of an image point can be derived from the measured appearance properties.

The measurements for the determination of the appearance properties of the image points can be simplified depending on the type of image reproducing device used. For example, it is sufficient with an inkjet printer to characterize the characteristics of a nozzle in order to predict appearance properties of image points produced with the same nozzle even at other positions of those image points which are produced with the same nozzle.

Preferably the test image points are selected such that at least a large portion of the position dependent changes of the appearance properties of the image points for a specific image reproducing device are captured. Thus, the test image points are preferably selected such that they characterize the position dependent characteristics of the specific image reproducing device during the reproduction of images.

For example, if one captures in the above mentioned manner the appearance properties of image points which are produced by a specific image reproducing device in answer to incoming image data to be reproduced, and if further the dependence of the appearance properties of the image points from the position of the image points in the image is captured, that information which characterizes the specific image reproducing device (herein also called device characteristics) are input into or made available to the process in accordance with the invention. If the process in accordance with the invention is realized, for example, as a program, the characterizing information or the device characteristics can be stored in a memory which is accessed by the program or can even form part of the program code.

The device characteristics influence appearance properties of the image points produced on the basis of reproduction image data. They describe especially the position dependent influence which is especially typical for the image reproducing device. The device characteristics describe especially the influence on the appearance properties. depending on the properties of the image reproducing device. The properties of the image reproducing device are fixed especially by the hardware and/or software of the image reproducing device which processes the image data, for example by the properties of the image dot producers (see further below).

Once the device characteristics which characterize a specific image-reproducing device are available, the following steps are carried out in accordance with the invention. Image data are input which are to be used as a basis for the reproduction of an image and, thus, are referred to in the following as "reproduction image data". The reproduction image data set the nominal position and the nominal properties of the image points to be reproduced for each individual image points in the image to be reproduced. The reproduction image data describe a desired image or nominal image which is to be reproduced as exactly as possible. The reproduction image data processed according to the process in accordance with the invention are referred to as control values which describe especially the actual properties of the image to be reproduced and with which especially an image reproducing device is controlled.

The input reproduction image data are used to determine or calculate the appearance properties of the image points to be expected at the different positions. The device characteristics which characterize the specific image reproducing device are used during the determination to determine or calculate the appearance properties to be expected for (each) image point and for all positions or at least a portion of the positions of the image points. The positions can be determined, for example relative to the image producing device (for example, device body), relative to an image medium (for example, the edge of a paper or an image display) or relative to the image, An image to be expected with an uncorrected reproduction can be determined in this manner in a first step, which image is then used in a second step as the basis for a correction of the reproduction image data, in order to set or determine the control values for the image reproduction. The control values can also be determined directly in a single step and directly in consideration of the device characteristics. The control values are preferably produced depending on the appearance properties to be expected for the individual image points. This reproduction is carried out in such a way that upon reproduction of the image on the basis of the control values, an image is produced which especially for a human observer (for example, according to CIE standard) optically or visually has smaller deviations from the nominal image than an image which is produced under non-consideration of the device characteristics, i.e. when the reproduction image data are input, for example, directly into the image reproducing device or are subjected to a conventional half tone process. Thus in particular, the process in accordance with the invention can replace or complement a conventional half-tone process.

The artefacts produced by the characterizing properties or device characteristics of a specific image reproducing device are preferably removed or reduced in that the visual interaction of the appearance properties of neighbouring image points during the observation of the image by a human observer it is taken into consideration. Thus, the individual appearance properties of the image points of the subregion co-operate in determining the (overall) optical or visual appearance of the subregion. This is true especially when the individual image points can no longer be resolved by the observer. The visual or optical appearance of a subregion of an image or the optical property of a subregion is influenced, for example, by the geometric distribution of the image points in the subregion and by the color values of the individual image points. A compression of the image points can, for example, cause a decrease of the brightness of the subregion, if the background of the subregion is brighter than the image points. Relative position displacements between the image points can also change the mean color value of the subregion as it appears to an observer. This is the case especially when half tone processes or zither matrix or dither matrix processes are used for the image production. Halftone processes include not only dither matrix processes but also error diffusion processes, whereby a dither matrix processes operate with delimiting non-overlapping positions and error diffusion processes go through the image image point by image point so that the subregions overlap. Both dither matrix processes as well as error diffusion processes can be used for the production of halftones (intermediate color values).

Preferably, expected optical or visual properties of the subregions are determined or calculated based on the appearance properties to be expected of the image points in the sub region. Control values are then produced on the basis thereof in such a way that the optical properties of the sub regions of the reproduced image deviate less from the optical properties of the sub regions of the nominal image than would be the case upon reproduction without consideration of the device characteristics.

The halftone process can be used in combination with the device characteristics to calculate in a first step an actual image to be expected or a color value to be expected of a subregion or an image point. The image data are then corrected in a second step so that the halftone process delivers a result, which is closer to the nominal value. Alternatively, or additionally, the halftone process, especially the error diffusion process based on the device characteristics can be modified such that the modified halftone process (in one step) provides results which are closer to the nominal result than would be the case with the non-modified halftone process.

The device characteristics of the image producing device which are used as the basis for the process preferably describe at least the three-dimensional properties of the image points and their position dependency. Three-dimensional properties of the image points are those properties of the image points which influence the visual or optical appearance of the image points on the basis of the (relative) three-dimensional location of the image point (to the nominal position) and/or the shape and/or size. The three dimensional properties of the image points include especially the relative location (distance, spacing, angular relation) to the adjacent image points and/or the size of the image point. When the image points which are produced by a specific image-reproducing device have different three-dimensional properties at different locations, even though the image points are based on the same image data (for example the same color value to be produced), artefacts are created. These artefacts produced by the three-dimensional properties are compensated in accordance with the invention by color value changes of the image points so that they are no longer apparent to a human observer. The three-dimensional properties of the image points which are to be expected for an uncorrected reproduction can thereby be determined or calculated on the basis of the reproduction image data and the device characteristics which describe the three-dimensional properties of the image points produced therewith and their position dependency. This determination is preferably carried out position dependent and based on the device characteristics.

When the three-dimensional properties of the image points, which are to be expected, are determined at least as far as a position dependency is to be expected, sub region properties to be expected are determined from the expected three-dimensional properties. For example, the proximity of an image point to an adjacent image point in a sub region is determined. A sub region includes more than one image point.

Based on the sub region properties to be expected, the control values are then calculated or determined. The calculation is thereby carried out such that deviations of the three-dimensional properties of the image points in a subregion (for example, deviations from the nominal position) from the nominal properties predetermined by the reproduction image data (for example no deviation from a nominal position) are compensated by changing at least one color value of an image point in the subregion so that a human observer which observes the mean appearance of the subregion perceives a reduced deviation from the nominal appearance of the subregion. For example, when the three-dimensional properties of the subregion cause image points of the subregion to be spaced further apart than they should be and if this causes for a human observer a brightening of the appearance of the subregion, the color value of at least one image point in the subregion is made darker by the correction.

Image reproduction processes exist wherein a specific color value is assigned to subregions of the image to be produced, which color value was produced by the joint appearance of an image point and adjacent points in the subregion. Examples for those processes are dither matrix processes which represent a subgroup of the halftone image processes. Such subregions which have been associated with a common optical property such as, for example, a color value, are herein referred to as cells. While the above mentioned subregions can also overlap or surround one another and, thus, have any shape the cells are directly adjacent, non-overlapping subregions of the image. The subregions which depending on the process are overlapping or non-overlapping are preferably selected such that they cover or include the whole image or at least the major part thereof. The process in accordance with the invention can be carried out subregion by subregion. The process is preferably carried out sequentially for overlapping subregions. For overlapping subregions, one preferably proceeds image point by image point according to the error diffusion process.

When images are produced by way of such subregions, for example, cells (in the following described purely exemplary for "cells"), a cell is often not completely filled with image points, for example, in the dither matrix processes. In those cases, the space between the image points (for example the sheet background in a printer) contributes to the (mean) visual or optical appearance of the cell. The device characteristics or specific properties of an image-producing device can now cause deviations of the individual image points of a cell from their desired appearance properties. Those deviations of the individual image points of a cell cause a change in the overall appearance of the cell. Changes of the three-dimensional properties of the image points (for example deviations of the location from nominal positions) can thereby lead not only to a change of the brightness of the cell in co-operation with the intermediate space (background), but also more generally to a change of the color value of the cell. Preferably the change of the optical overall appearance of the cell is determined or calculated based on the expected apparent properties of the image points of the cell. Based on the thereby expected appearance property of the cell, those properties of the image points of the cell are then changed by correction of the reproduction image data set, which cause a reduction of the deviation of the overall appearance of the cell from a nominal appearance. During correction of the image data it is of course taken into consideration which appearance properties of the image points can be influenced through a correction of the image data and which cannot. For example, if the three-dimensional property (for example the location relative to adjacent image points) cannot be influenced, but only the color value or the size of the image point, only the appearance properties which can be influenced are changed by correction of the image data so that a reduction of the deviation from the nominal image is achieved. As mentioned above, any direct calculation of the control values can be carried out without going through the calculation of expected properties, for example, within the framework of a halftone process, taking into consideration the device characteristics.

During the generation of the control values, which can correspond to corrected reproduction image data, correction processes are preferably used, which can correspond to corrected reproduction image data, which during the correction of the image data associated with a specific image point, takes into consideration the reproduction image data and especially the appearance properties of the adjacent image points. Especially the effect of the correction of one image datum on the correction of adjacent image data is taken into consideration. Error diffusion processes are especially used herefor. Different correction variants can also be simulated and the optimal variant with the smallest deviation from the nominal image of the cell or the subregion can be selected. A "correction" means herein that, different from the prior art, device characteristics are used during the determination of the control values.

Whether a correction is carried out or nor can be linked to threshold values or tolerances. If the threshold values or tolerances are exceeded, the correction is carried out. The threshold values or tolerances can be selected for the whole image or partial regions or subregions or cells of the image.

Especially, maintenance processes can be carried out on the image reproducing device, such as, for example, the cleaning of nozzles in inkjet printers, when the tolerances or threshold values are exceeded. For example, only if the execution of the maintenance processes still does not lead to a lowering below the threshold values, the correction is carried out.

Furthermore, warning signals can be output when even after carrying out the correction or maintenance, the tolerances or threshold values are still exceeded which describe the deviation of the nominal image from an image produced on the basis of the corrected image data.

Certain image reproducing devices, such as, for example, inkjet printers or laser printers, use several image point producers (for example, nozzles or lasers), which produce a multitude of image points in an image. The individual image point producers can have different characteristic properties which determine the device characteristics of the image reproducing device. For example, the nozzles of an inkjet printer, or a laser beam of the lasers of a laser printer can be oriented not exactly parallel to one another. This then leads to position dependent appearance properties of the image points or pixels. In order to capture those, test images can be measured with an optical measurement device, which show at least the majority of the image points reproducible with the different image point producers.

The measured image points and their appearance properties are then assigned to the individual image point producers in order to characterize the latter. The appearance properties of the image points expected upon a production based on reproduction image data are determined by finding out by which image point producers the individual image point is produced. Based on the characteristic properties (also called "characteristics") of the image point producer, the appearance properties are then determined for those image points which are to be produced with the image point producer.

In the process in accordance with the invention, the device characteristics can be determined prior to input of the reproduction image data for all positions from the characteristics of the image point producer and their association with positions in an image to be reproduced. However, the assignment of the image point producers to positions can also be carried out only during the determination of the expected appearance properties of image points, which are based on reproduction image data. This should be preferred especially when the position dependency of the device characteristics is dependent on the reproduction image data, for example, when dependent on the reproduction image data it is determined which image point producers are used for which positions. In that case, a determination of the expected appearance properties from the image points to be reproduced is carried out based on the input reproduction image data. The input reproduction image data determine which image point is produced with which image point producer. The expected appearance properties of the image points are then determined from the characteristics of the image point producer used for the production, The invention further relates to a program which during execution on the computer carries out the process in accordance with the invention. Device characteristics can thereby be provided to the program and/or can be part of the program code.

Image reproducing devices in accordance with the invention preferably include a control device which carries out the process in accordance with the invention. The corrected reproduction image data produced are used for the production of the image by an image reproducing device. The specific image reproducing device which has the device characteristics is preferably the same image reproducing device which is used for the image reproduction or an image reproducing device of similar type and therefore with similar specific properties.

Photographic labs, such as, for example, large labs or minilabs, have at least one image reproducing device in accordance with the invention in order to reproduce photographic image data. Minilabs are small photographic labs with a floor coverage of few square meters and especially a floor coverage of less than one square meter. In a photographic lab, image information is input digitally, for example, through digital data carriers or through a network or also classically (analog), for example, by way of films. The input image information is digitized in order to obtain digital information. The digital image information is then processed, whereby the image reproducing device in accordance with the invention or the process in accordance with the invention is used.

The invention further relates to the use of the process in accordance with the invention, the program in accordance with the invention or the image reproducing device in accordance with the invention, in the field of photography for the production of photographic illustrations or for the output of the corrected, photographic reproduction image data.

The output of the control values (for example, corrected reproduction image data) is carried out preferably through a data interface or a data carrier, for example, CD's or DVD's or other digital data carriers. The output can also be achieved by way of the digital interface to a network, especially a LAN or the Internet. The control values can be represented, for example, in any color space (for example, RGB, CMYK, lab, . . . ) and, for example, can present density values.

For example, an end user or a photo business can send test images to a central photo lab in accordance with the invention which allow for the determination of the device characteristics of the image reproducing device used (for example, inkjet printer). A program in accordance with the invention can then be made available based hereon to the end user or the photo business, which program is adapted to the device characteristics of its image reproducing device. If reproduction image data are received from the end user, corrected reproduction image data can also be produced which are adapted to the image reproducing device (printer) of the end user and are sent to the latter, for example, through the Internet. The end user can then use the so produced image data as a basis for the reproduction with its image reproducing device (printer, monitor, etc.) in order to thereby be able to observe an image optimally adapted to the image reproducing device.

BRIEF DESCRIPTION OF THE DRAWINGS

FIG. 2 is a procedure diagram which shows the processing of the image data to the image reproduction or to the image printing;

FIG. 3 is a dot matrix;

FIG. 5 illustrates the dependency of the tone density of different nozzles and their dot size;

FIGS. 6a and 6b illustrate a process for the tone density compensation; and

FIG. 7 describes a procedure diagram for an embodiment of the error correction process in accordance with an exemplary embodiment of the invention.

DETAILED DESCRIPTION OF THE PREFERRED EMBODIMENTS

Figure 1:
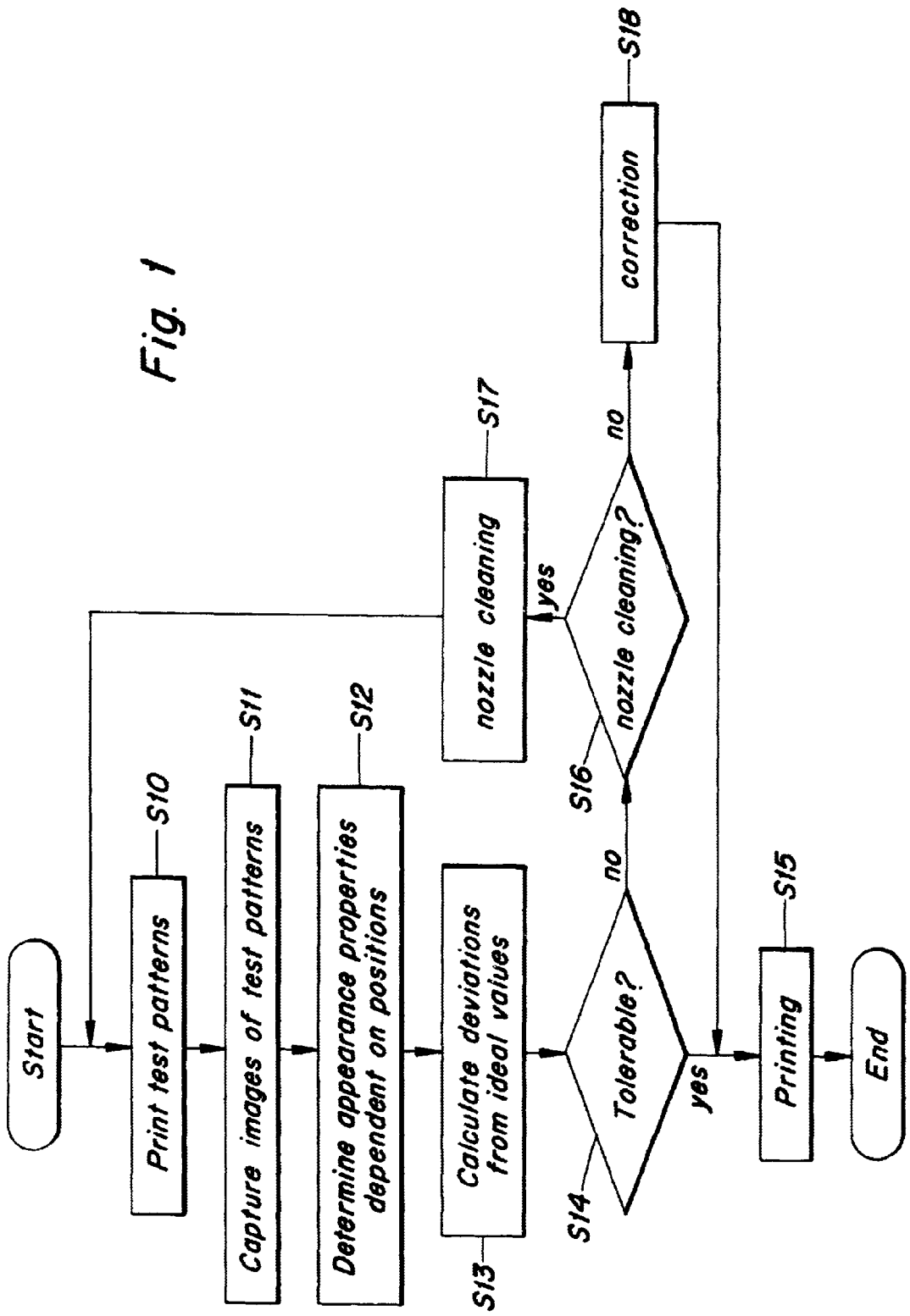
FIG. 1 shows a flow diagram for the integration of a process in accordance with an exemplary embodiment of the invention into a printing process.

The following description of preferred embodiments describes by example the carrying out of the invention in an inkjet printer. First is the determination of the device characteristics of the inkjet printer, if they are not already known. For example, one assumes in an inkjet printer that the position dependency of the appearance characteristics of the image points produced by the inkjet printer are determined by the characteristics of the inkjet nozzles (image point producers).

One proceeds as follows, for example, for the determination of the nozzle characteristics:

a) test patterns are printed which consist of dots which are produced preferably with the use of all nozzles, whereby preferably each printing color of the inkjet printer is used. In the case where the printing head can print several dot sizes, i.e. can vary the droplet size, for example, it can be advantageous to produce patterns for all possible dot sizes. Thus, overall all possible types of image point production are preferably played through for each nozzle (image point producer).

b) the images of the printed test patterns are recorded or stored. Optical measurement devices are preferably used herefor such as, for example, digital cameras, spectrometers and scanners which allow especially a capturing of the position of the image points or their location relative to adjacent image points, the shape of the image points, the size of the image points and/or the color value or the color density of the image points.

c) the appearance properties of the image points such as especially size and color density or brightness and the positions of the printed image points are determined by the recorded or stored images.

d) the image points are assigned to the individual nozzles in order to determine the characteristics of the nozzles. Especially the deviation from ideal values given for the nozzles are calculated therefor.

Based on the nozzle characterization, the following three possible cases result:

all values of the nozzles (image point producers) are within a preselected, permissible range. Thus the printing can be commenced without a special data processing or other processes.

a nor tolerable number of nozzles (image point producers) fails to function or exhibits such function errors that they cannot be compensated by the process in accordance with the invention. For example, common nozzles can be plugged or totally incorrectly oriented. Apart from the impairment of the printing quality, this can also result in an impairment of the printing speed. A warning signal is output in those cases, for example, or an error removal process is initiated which relates especially to the mechanics of the image point producer. For example, a printing head cleaning process is carried out. Subsequently, a renewed characterization of the nozzles (image point producers) is repeated.

if the nozzles (image point producers) with their deviations lie in the tolerable range, the deviations from the ideal value are compensated by the process in accordance with the invention, especially through data processing or software.

The above-described cases and the processes resulting therefrom are illustrated in FIG. 1. Instead of the nozzle cleaning shown therein, any other type of error correction processes, for example, a new adjustment of the orientation of the nozzles, can be carried out. In other types of image reproducing devices, such as laser printers, a new adjustment, for example, of the lasers used, can be carried out.

At the commencement of the process shown in FIG. 1, print test headings are printed in a step S10. Thereafter, the images of the test patterns are captured in a step S11. The positions (for example, cartesic coordinates X, Y), the size and the color density of the points or dots are then determined. Thus, in step S12, the appearance properties of the image points are determined depending on the positions. Deviations from ideal values are thereafter determined in a step S13.

It is tested in step S14 whether the deviations are within the preselected tolerance. If that is the case, printing is commenced in step S15 and the process of the FIG. 1 ends after the printing.

If the deviations are not within the tolerance in step S14, it is tested in the following step S16 whether a nozzle cleaning is necessary. If that is the case, a nozzle cleaning is carried out in step S17. The appearance properties are then again determined, commencing with the step S10.

If a nozzle cleaning is not required or does not promise success, the process of FIG. 1 switches to step S18 in order to compensate the deviations in the printing data. A nozzle cleaning does then not promise success when, for example, the deviations are three-dimensional deviations which, for example, are caused by inclination of the nozzles. On the other hand, when the droplet size and thereby the image point size is smaller than intended, a cleaning can definitely promise success. The same applies when certain nozzles do nor eject any ink and a blockage of the nozzles is thus obvious. Based on criteria, determined in this manner and associated tolerances, a selection is then made in step S16 between the nozzle cleaning according to step S17 or the compensation or correction of the reproduction image data according to step S18. In other words, a selection is carried out in step S16 between a hardware correction or mechanical correction (S17) and a software correction or image data correction (S18).

FIG. 2 shows the data flow from the input, "raw" image data to the control data for the printer. The input image data are, for example, RGB image data, which describe an image as a bitmap. Since the image resolution of the input bitmap often does not correspond with a resolution of the printer, a scaling and thereby adaptation to the printer resolution is carried out. If the resolution is adapted, transformation of the image data and especially their color values into the printer color space is carried out in the next step. If the printer can then reproduce, for example, four colors, for example, cyan (c), magenta (m), yellow (y), and black (k), the transformation is carried out, for example, from an RGB color space into a CMYK space. Each color is thereby associated, for example, with a certain number of nozzles, whereby in certain printer types a nozzle can produce different image point sizes or droplet sizes, whereby the density of the color value is changed. (A transformation into the printer color space can possibly be carried out before the scaling).

The production of intermediate color values which cannot be reproduced by the colors of the printer, i.e., for example, not alone through C or M or Y or K, is carried out through the so-called halftone process. For example, intermediate gray values or intermediate luminance values, which cannot be reproduced by individual nozzles, can also be produced by this halftone process. Different halftone processes such as, for example, dither matrix processes or error diffusion processes are known. See, for example, "Digital Color Halftoning", Henry Kang, Bellingham, Wash., SPIE Optical Engineering Press, 1999, the disclosure of which is hereby incorporated by reference in its entirety.

The three steps of the scaling to the printer resolution, transformation into the printer color space, and halftone processing, are also referred to as Raster image processing. After the Raster image processing data are used from the so obtained image data set for the printing of strips (swath) these printing strips (swaths) are produced by the scanning process (main scanning) through a printing head with singular nozzles. Once these data-forming printer are extracted, they are transferred to the printing head in order to control it based on the data for the printers swaths.

The process in accordance with the invention is preferably carried out between the input of the bitmap and the transfer to the printer heads, especially preferably, within the framework of a Raster image processing and there especially preferably during the halftone processing.

Conventional processes during the processing according to FIG. 2 assume that for the same image data, all image points or pixels have the same appearance properties. Especially, the conventional processes assume for inkjet printers that all nozzles have the same. The process in accordance with the invention deviates therefrom. According to the invention, characteristics of the individual nozzles are taken into consideration in order to thereby draw conclusions from the appearance properties of the image points produced by the nozzles.

Data are principally manipulated in accordance with the invention in such a way that an observer a normal distance from a printout can no longer discern the artefacts, although by microscopic observation or very close observation, the artefacts are still visible, the correction is carried out in such a way that a normal observation distance of especially more than 10 cm in a human observer leads to a hiding of the artefacts from the observer, caused by a visual averaging of several image points or pixels. Since an observer can no longer visually resolve individual image points, the appearance properties of adjacent image points can be used in accordance with the invention, to compensate for deviations in the appearance properties of the individual points. This principle in accordance with the invention can be used not only for inkjet printers, but for any type of image reproducing device.

As already mentioned above, the process in accordance with the invention is preferably carried out during the halftone processing. The result of the conversion into the printer color space and the scaling of the printer resolution (for example 720×720 dpi) as shown in FIG. 2 is a matrix with elements which represent the continuous tone densities $d_{C1}, \ldots d_{Cn}$, whereby C1–Cn are the primary colors of the printer color space (for example CMYK). The matrix represents an example of reproduction image data.

FIG. 3 shows an example of such a matrix. In the matrix shown in FIG. 3, each element describes an image point. This image point or pixel is produced by the nozzles $N_1$ to $N_m$, whereby 1 to m are the colors of the inks present in the printer (for example CMYK plus light cyan and light magenta) and the image point or image pixel can correspondingly have the color defined by the continuous values $d_{C1} \ldots d_{Cn}$ or at least approximate it (see further below). Especially, an exact correlation exists between an element of the matrix, the position of the image point in the image and the nozzle used for the production of the image point. The matrix elements correspond to the reproduction image data with the nozzles used for the protection of this image point.

If the image points are produced according to the nesting process or interleave process, this must be taken into consideration for the assignment of the corresponding matrix elements to the nozzles. For example, in the interleave process, the printing head is downwardly displaced after a swath by half the distance between two nozzles in order to print in the intermediate space.

A printing head consists, for example, of several rows of nozzles, whereby each row is assigned to one color. The nozzles of one row are counted through as nozzle numbers. For example, if there are six different rows for six colors and 48 nozzles in each row, a total number of nozzles of 6×48=288 results. Starting from the position and color of the image point and possibly under consideration of the interleave process, an image point or the corresponding matrix element can therefore be correlated with a specific nozzle.

The test printouts are preferably carried out in such a way that with an optical measuring such a correlation is possible without any doubt. Especially, an overlap of image points produced by different nozzles is preferably avoided during the test printout.

Figure 4:
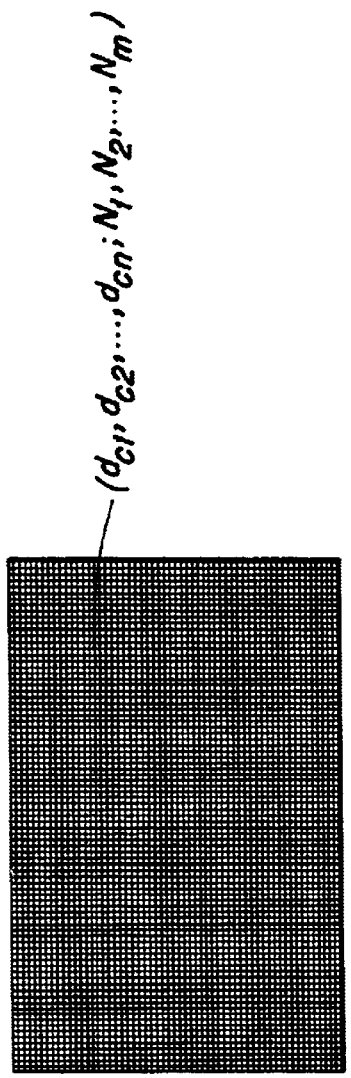
FIG. 4 is a table for the capturing of the characteristics of inkjet nozzles.

If one or more test printouts were made, from which an exact correlation of the image points to the individual nozzles is possible upon an optical measurement of the image, a table, for example, is produced as is shown in FIG. 4, wherein the characteristics of all nozzles are stored. The table in FIG. 4 includes, for example, for each nozzle number and for each color (which means for the corresponding nozzle row) data on the position deviations (appearance property) in horizontal direction ($\Delta x_{pos}$) and in vertical direction ($\Delta y_{pos}$) which are dependent on the droplet size (appearance property) of the droplet produced with a certain nozzle as well as data on the color value D(appearance property) for a specific print resolution. A nozzle is thereby exactly identified by the nozzle member and the ink color.

If the optical measurement is carried out, for example, not spectrally resolved but with color filters, the color value D in the table can simply be replaced by the color density or the gray value D.

FIG. 5 shows an example for one relationship between the droplet size and the gray value which is dependent on the nozzle number.

The color value compensation or gray value compensation is described in the following. The matrix is herefor passed through line by line from left to right, for example, with a 3×3 core routine (kernel). Of course, any other pattern deviating from the 3×3 pattern (3×3 subregion) is possible. However, it is preferred to always capture with the pattern at least 3 matrix elements. With the 3×3 core routine, for a selected element (i,j) (see hatched field in FIGS. 6a and 6b), elements which are located above the selected element and on the line left of the selected element have already been processed. Those element have an associated image point size K. The elements below and to the right of the selected element, including the element (i,j) have not yet been processed in FIG. 6a. Those elements are still associated with a continuous color value density or tone density (gray value) D. The processed elements have already been assigned a discreet value by assignment of an image point size or droplet size which can only have discreet values.

In the example illustrated in FIGS. 6a and 6b, only one color is considered. The process can be easily expanded to several colors, other kernel sizes and other manners of advancement of the kernel through an image matrix.

In order to compensate for variations of the tone density, for example, an error diffusion process can be implemented as can also be used for example, in an algorithm for a halftone processing. Because continuous color tone images are then also transformed into few discreet colors which the printer can produce.

The error diffusion process advances element by element and decides by selection of the droplet size k' which image point size k should be printed, wherein the expression $$|d(i, j) - D_{x'}(N(i, j))|$$

becomes minimal. $D_{k'}$ (N(i, j)) thereby refers to the color densities which can be produced by all possible droplet sizes k' of that nozzle N which will print the image point on the basis of the known correlation between element and nozzle. When a printer ink is present in different dilutions (for example cyan and light cyan), the minimal difference between the color value density d and the possible color densities dk' of all dilations of the corresponding primary color is selected. In contrast to the error diffusion processes known for the halftone processing, the measured and therefore real tone densities or color values of each individual nozzle are taken into consideration and not assumed theoretical values which are the same for all nozzles. Different characteristics of the individual nozzles and therefore device characteristics can be taken into consideration in this manner in accordance with the invention.

It will be described in the following how artifacts can be compensated on the basis of position deviations (appearance properties) of the image points. Such deviations are preferably compensated in a following step of the error diffusion process. In that step it is taken into consideration that the tone density perceived by an observer is determined both by the tone density of an image point as well as by the tone density of the background or the intermediate space between the image points. If the image tone density of the background is brighter than the density of the image points, which is normally the case during printing onto a white paper with a conventional inkjet printer, the density d' perceived by an observer decreases, if the spacing to the adjacent points is larger than the ideal spacing, and the perceived density increases if the spacing is smaller.

A measure is therefore preferably calculated with which describes the mean spacing to the adjacent points. This can be described, for example, by the sum of the spacings $\Delta$tot of the point (i,j) to the adjacent already processed points (i−1,j); (i−−1,j−1); (i,j−1); (i+1, j−1).

The nominal positions of the elements or the associated nominal positions of the image points result from the indices given in the expressions in brackets, whereby the assigned nozzles result from the nominal positions and therefrom in turn the position deviations $\Delta x_{pos}$, $\Delta y_{pos}$ which flow into the above mentioned spacing calculation. The position deviations represent to be expected appearance properties of the image points of a subregion which consists of the positions (i,j) (i−1j); (i−1,j−1); (i, j−1) and (i+1,j−1). The density perceived by an observer (the appearance property to be expected on the basis of the device characteristics) which takes into consideration the optical interaction of the color values of the image points and the background, can be calculated, for example, by a polynomial series developed for the measured density d and under consideration of the spacing sum $\Delta_{tot}$:

$$D' = D \cdot f_0 + D \cdot \left(\frac{\Delta_{tot} - \Delta_0}{\Delta_0}\right) \cdot f_1 + D \cdot \left(\frac{\Delta_{tot} - \Delta_0}{\Delta_0}\right)^2 \cdot f_2$$

where $f_1$ and $f_2$ are weighting factors or reinforcing factors, which are to be experimentally determined and are dependent, for example, especially on the printed paper and/or the pigments used. Furthermore, $\Delta_0$ corresponds to the sum of the distances, when the position deviations $\Delta x_{pos}$ and $\Delta y_{pos}$ of all points considered equal zero. If $\Delta_{tot}=\Delta_0$ then $D'=D\times f_0$. If $\Delta_{tot} \neq \Delta_0$, then D' is adjusted according to the deviations, The error which is created in that a discreet perceived tone density D' (appearance property to be expected) is assigned to an element which has a continuous tone density d, is then as follows:

$$\Delta d = d - D'$$

This error is then distributed amongst the adjacent Raster points which have not yet been processed. The continuous tone densities of the adjacent Raster elements (reproduction image data) are modified or corrected, for example, as follows:

$$d'(i+1,j)=d(i+1,j)+\Delta d \Delta df_{1,0},$$

$$d'(i+1,j+1)=d(i+1,j+1)+\Delta d \Delta df_{1,1},$$

$$d'(i,j+1)=d(i,j+1)+\Delta d \Delta df_{0,1},$$

$$d'(i-1,j+1)=d(I-1,j+1)+\Delta d \Delta df_{1,1}.$$

The factors $df_{ij}$ are so called diffusion factors (for example, 7/16, 1/16, 5/16, 3/16 respectively for $df_{1,0}$, $df_{1,1}$, $df_{0,1}$, $df_{-1,1}$) according to R. W. Floyd and L. Steinberg, "An adaptive algorithm for spatial gray scale", Proc Soc. Inf. Display, Vol. 17, No. 2, pages 75–77, 1976, the disclosure of which is hereby incorporated by reference in its entirety. Those diffusion factors define the distribution of the error amongst the neighboring image points.

In the error correction process, one can, for example, proceed according to the flow diagram of FIG. 7. At the beginning the variable i and the variable j are respectively set to 1 in a step S70. In a subsequent step S71, one rounds to the next closest, discreet density D based on measurement, which corresponds to a specific image point size K, as was discussed in connection with FIGS. 6a and 6b.

Thereafter, in a step 72, the spatial error ($\Delta_{tot}$) is determined which results from spatial deviations ($\Delta x_{pos}$, $\Delta y_{pos}$) of adjacent image points from their nominal positions by reason of the device characteristic, and depending on the position i, j as described above. Then, in the step S73, the density D' perceived or to be expected is determined based on the spatial error and the density D to which was rounded. This determination is also carried out position dependent.

Next, a rounding error is calculated in step S74, which results from the transition of continuous values d of the matrix elements to discreet values D'. After this calculation in step S74, the distribution of the rounding error onto the neighbouring matrix elements (reproduction image data) is carried out in step S75. Additionally or alternatively, the process, especially for a rounding error which is too large, can be carried out again and iteratively for the same i and j, whereby D is varied until $\Delta d$ becomes minimal.

Thereafter, the variable i is counted up by 1 (S76) and if the variable i which is a line variable, has not yet surpassed the image width, the steps S71–S76 are repeated. If the variable i has already exceeded the image width, the variable j, which increases along the columns of the image, is increased by 1 in step S78 and the variable i is reset to 1. If the variable j does not exceed the image height, the steps S71 to S78 are repeated. If the image height is exceeded in step S79, the process ends.

The above process minimizes first the color value deviations caused by the device characteristics by determining D and then the density deviations $\Delta d$ caused by the position deviations. For carrying out the correction, the position deviations can also be considered first and then the color deviations.

As already mentioned above, the invention can be used with many different image reproducing devices, for example, displays, monitors, projectors and printers. The printers can be, for example, projecting laser printers or electrostatic laser printers or DND's or other printers which operate according to the point Raster process. Thermal printers and inkjet printers can also be used. The image reproducing devices can be image reproducing devices of many different sizes as they are used, for example, in the office environment (for example, table printers) or in the professional environment for large formats. Especially, they can be image reproducing devices which find use in the photography field for photographic labs, especially minilabs.

Device specific errors are considered in the error diffusion process which takes into consideration the errors of the specific image reproducing device. The error can be evenly distributed with error diffusion factors onto neighbouring image points or carried forward. The carrying forward of the error can be directional (horizontal, vertical . . . ) for all different error types. But, the carrying forward of the error can also be weighted. The weighting or directing of the carrying forward of the error or the error propagation can be made dependent on the error type. The error competition processes can be combined with nesting printing processes or interleave printing processes.

It will be appreciated by those skilled in the art that the present invention can be embodied in other specific forms without departing from the spirit or essential characteristics thereof. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. A process for the reduction of artefacts during the reproduction of an image having a plurality of image points based on image data and by way of a specific image reproducing device, whereby the image points have appearance properties and are produced by the specific image reproducing device in answer to control values, wherein said appearance properties influence or determine the visual or optical appearance of the image points in the image and wherein the image data set nominal appearance properties of the image points, the process comprising the steps of:

at least one of providing and inputting device characteristics of the image reproducing device which describe an influence on the appearance properties of the image points depending on positions of the image points and depending on properties of the specific image reproducing device, said influence resulting in a deviation of the appearance properties from the nominal properties;

inputting image data; and setting control values for the production of image points by the image reproducing device based on the image data associated with the image points and under consideration of the influence on the appearance properties of the image points to be reproduced, the influence being determined depending on the positions of the image points and based on the device characteristics.

2. Process according to claim 1, wherein the control values for the image reproduction of an image point are set in consideration of the influence on the appearance properties which is to be expected for neighboring image points on the basis of the device characteristics.

3. Process according to claim 1, wherein the influence of the appearance properties includes at least one of position deviations of the image points from nominal positions and deviations of color values of the image points from nominal color values.

4. Process according to claim 1, wherein appearance properties to be expected of a subregion which consists of several neighboring image points, are determined from the appearance properties of the image points of the respective subregion which are to be expected on the basis of the device characteristics, and the control values are produced on the basis of the to be expected appearance properties of the subregions in such a way that upon reproduction of the image with the control values the deviations of the appearance properties of the subregions from the nominal appearance properties defined on the basis of the input image data is smaller than in the case when the device characteristics are not considered.

5. Process according to claim 4, wherein subregions of the image which include neighboring image points overlap or border on one another, whereby the color value of each subregion is determined by the appearance properties of the image points in the subregion and, if an interstitial space is present, the color value of the interstitial space which optically fills the space between the image points, and wherein the image data assign to each subregion a nominal color value, with the step of producing the control values based on the image data, the device characteristics and the positions of the image points in the subregions so that the color values of the subregions differ as little as possible from the nominal values.

6. Process according to claim 1, wherein:

the image points of an image are produced using a plurality of image point reproducers, during the reproduction of an image a single image point reproducer produces a plurality of image data, the device characteristics and their position dependence result from characteristics of the image point reproducers as well as the assignment of image point reproducers to positions in an image to be produced, and the characteristics of the image point reproducers describe the influence on the appearance properties of image data produced with a specific image point reproducer.

7. Process according to claim 6, wherein for the determination of the color values first the color values to be expected of the image points associated with the image data are determined based on those device characteristics which concern the color value generation, and then the control values are calculated based hereon and in consideration of those device characteristics which concern position deviations of the image points.

8. Process according to claim 1, wherein the image data is photographic image data.

9. Program which when at least one of loaded on a computer and running on a computer, initiates the computer to carry out a process for the reduction of artefacts during the reproduction of an image having a plurality of image points based on image data and by way of a specific image reproducing device, whereby the image points have appearance properties and are produced by the specific image reproducing device in answer to control values, wherein said appearance properties influence or determine the visual or optical appearance of the image points in the image and wherein the image data set the nominal appearance properties of the image points, the process comprising the steps of:

at least one of providing and inputting device characteristics of the image reproducing device which describe an influence on the appearance properties of the image points depending on positions of the image points and depending on properties of the specific image reproducing device, said influence resulting in a deviation of the appearance properties from the nominal appearance properties;

inputting image data; and setting control values for the production of image points by the image reproducing device based on the image data associated with the image points and under consideration of the influence on the appearance properties of the image points to be reproduced, the influence being determined depending on the positions of the image points and based on the device characteristics, wherein the device characteristics at least one of can be input into the program and are components of the program code.

10. Image reproducing device with a control device for carrying out a process for the reduction of artefacts during the reproduction of an image having a plurality of image points based on image data and by way of a specific image reproducing device, whereby the image points have appearance properties and are produced by the specific image reproducing device in answer to control values, wherein said appearance properties influence or determine the visual or optical appearance of the image points in the image and wherein the image data set nominal appearance properties of the image points, the process comprising the steps of:

at least one of providing and inputting device characteristics of the image reproducing device which describe an influence on the appearance properties of the image points depending on positions of the image points and depending on properties of the specific image reproducing device, said influence resulting in a deviation of the appearance properties from the nominal appearance properties;

inputting image data; and setting control values for the production of image points by the image reproducing device based on the image data associated with the image points and under consideration of the influence on the appearance properties of the image points to be reproduced, the influence being determined depending on the positions of the image points and based on the device characteristics, wherein the control values are at least one of used for the image reproduction and output through a digital interface.

11. Image reproducing device according to claim 10, wherein the image reproducing device is selected from the group consisting of an inkjet printer, a laser printer and a digital photographic printer.

12. Photographic lab for at least one of the reproduction of photographic image data and for the output of at least one of the control values and data derived therefrom, the photographic lab comprising:

at least one image reproducing device with a control device for carrying out a process for the reduction of artefacts during the reproduction of an image having a plurality of image points based on image data and by way of a specific image reproducing device, whereby the image points have appearance properties and are produced by the specific image reproducing device in answer to control values, wherein said appearance properties influence or determine the visual or optical appearance of the image points in the image and wherein the image data set nominal appearance properties of the image points, the process comprising the steps of:

at least one of providing and inputting device characteristics of the image reproducing device which describe an influence on the appearance properties of the image points depending on positions of the image points and depending on properties of the specific image reproducing device, said influence resulting in a deviation of the appearance properties from the nominal appearance properties;

inputting image data; and setting control values for the production of image points by the image reproducing device based on the image data associated with the image points and under consideration of the influence on the appearance properties of the image points to be reproduced, the influence being determined depending on the positions of the image points and based on the device characteristics, wherein the control values are at least one of used for the image reproduction and output through a digital interface.

13. Photographic lab of claim 12, wherein the photographic lab is a minilab or a large scale lab.

* * * * *